(12) United States Patent
Sakagami

(10) Patent No.: US 9,863,478 B2
(45) Date of Patent: Jan. 9, 2018

(54) MOTION GUIDE DEVICE

(71) Applicant: THK CO., LTD., Tokyo (JP)

(72) Inventor: Tetsuya Sakagami, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/124,183

(22) PCT Filed: Mar. 10, 2015

(86) PCT No.: PCT/JP2015/056980
§ 371 (c)(1),
(2) Date: Sep. 7, 2016

(87) PCT Pub. No.: WO2015/137325
PCT Pub. Date: Sep. 17, 2015

(65) Prior Publication Data
US 2017/0016483 A1    Jan. 19, 2017

(30) Foreign Application Priority Data

Mar. 14, 2014 (JP) .................................. 2014-051590

(51) Int. Cl.
*F16C 29/06* (2006.01)
*F16C 41/00* (2006.01)
(Continued)

(52) U.S. Cl.
CPC ............ *F16C 41/007* (2013.01); *F16C 29/00* (2013.01); *F16C 29/065* (2013.01);
(Continued)

(58) Field of Classification Search
None
See application file for complete search history.

(56) References Cited

U.S. PATENT DOCUMENTS 5,842,283 A * 12/1998 Yatsu .................... F16C 29/005
                                                             33/484
5,945,824 A *  8/1999 Obara .................... F16C 29/005
                                                          310/12.09
(Continued)

FOREIGN PATENT DOCUMENTS

EP         1 772 790 A1     4/2007
JP      2004-312983 A      11/2004
(Continued)

OTHER PUBLICATIONS

International Search Report dated Jun. 16, 2015, issued in counterpart International Application No. PCT/JP2015/056980, w/English translation (4 pages).

*Primary Examiner* — Phillip A Johnson
(74) *Attorney, Agent, or Firm* — Westerman, Hattori, Daniels & Adrian, LLP

(57) ABSTRACT

A motion guide device (1) includes: a track body that extends in a longitudinal direction; a movable body (20) that is mounted on the track body and is movable along the track body; an encoder scale that is disposed at the track body in the longitudinal direction; a sensor (50) that is disposed opposite to the encoder scale; and a folder (60) that is disposed at an end face of the movable body (20) in the longitudinal direction, houses the sensor (50) in a width direction of the track body, and holds the sensor such that the sensor faces the encoder scale.

10 Claims, 10 Drawing Sheets

(51) Int. Cl.
    *F16C 29/00*     (2006.01)
    *F16C 29/08*     (2006.01)

(52) U.S. Cl.
    CPC ........ *F16C 29/0609* (2013.01); *F16C 29/086* (2013.01); *F16C 29/082* (2013.01)

(56) References Cited

U.S. PATENT DOCUMENTS

| | | | |
|---|---|---|---|
| 6,333,628 B1 * | 12/2001 | Yeh | F16C 29/005 310/12.19 |
| 7,547,141 B2 * | 6/2009 | Chen | F16C 29/00 384/45 |
| 2005/0076526 A1 * | 4/2005 | Greubel | F16C 29/00 33/706 |
| 2006/0232141 A1 | 10/2006 | Teramachi et al. | |
| 2006/0260464 A1 | 11/2006 | Sato et al. | |
| 2009/0064523 A1 * | 3/2009 | Reusing | F16C 29/005 33/706 |
| 2010/0175272 A1 | 7/2010 | Rudy et al. | |

FOREIGN PATENT DOCUMENTS

| | | |
|---|---|---|
| JP | 2006-322487 A | 11/2006 |
| JP | 2008-267545 A | 11/2008 |
| JP | 2008-303953 A | 12/2008 |
| JP | 2009-524804 A | 7/2009 |
| JP | 4441525 B2 | 3/2010 |
| JP | 2013-119889 A | 6/2013 |

\* cited by examiner

MOTION GUIDE DEVICE

TECHNICAL FIELD

The present invention relates to a motion guide device.

Priority is claimed on Japanese Patent Application No. 2014-051590, filed on Mar. 14, 2014, the content of which is incorporated herein by reference.

BACKGROUND ART

Linear guides (motion guide devices) are provided with a track rail, a slider block, and balls (or rollers). Circulation paths are formed between the track rail and the slider block. As the balls circulate (roll) in these circulation paths, the track rail and the slider block conduct a relative motion (movement).

A drive source of the linear guide includes a ball screw, a wire, a belt, a linear motor, and so on. For example, when the drive source is the ball screw, the wire, or the belt, semi-closed control based on a stepping motor is generally used. However, when positioning precision higher than in the related art is required, it is necessary to install a linear encoder to use closed control based on this linear encoder.

For example, when the drive source is the linear motor, a relative position. between a magnet section installed along a track rail and a coil section installed in a slider block is detected. To this end, an encoder scale of a linear encoder is installed on the track rail, and a sensor of the linear encoder is installed on the slider block.

To reliably detect the relative position between the magnet section and the coil section, the linear encoder should be accurately installed on the linear guide. However, it is not easy to accurately install the linear encoder added afterward on the linear guide. Therefore, it is proposed to previously dispose the linear encoder at the linear guide.

CITATION LIST

[Patent Literature]
[Patent Literature 1]
  Japanese Patent No. 4441525

SUMMARY OF INVENTION

Technical Problem

In the conventional linear guide, the sensor is mounted on an end face of the slider block in a longitudinal direction of the track rail. Various members (placing members) are fixed to a placing surface (an outer surface) of the slider block.

Since the sensor is disposed in a small gap (space) between the track rail and the placing member, when a malfunction occurs at the sensor, the placing member should be demounted, otherwise maintenance of the sensor cannot be performed. However, when the placing member is, for instance, a heavy member, a time and a cost are required to demount or remount the placing member. It is very difficult to demount or remount the placing member in some cases.

Accordingly, the conventional linear guide has a problem that it has poor maintenability of the sensor.

Moreover, the conventional linear guide needs to mount the placing member with the sensor mounted on the slider block. For this reason, trouble such as disconnection of a cable of the sensor may occur.

Accordingly, the conventional linear guide has a problem that it has poor assemblability of the sensor.

The present invention provides a motion guide device that is excellent in assemblability and maintenability of an encoder.

Solution to Problem

According to a first aspect of the present invention, a motion guide device includes: a track body configured to extend in a longitudinal direction: a movable body mounted on the track body and configured to be movable along the track body; an encoder scale disposed at the track body in the longitudinal direction; a sensor disposed opposite to the encoder scale; and a folder that is disposed at an end face of the movable body in the longitudinal direction, houses the sensor in a width direction of the track body, and holds the sensor such that the sensor faces the encoder scale.

According to a second aspect of the present invention, the folder may include a guide part that guides the sensor in the width direction of the track body.

According to a third aspect of the present invention, the folder may include a holder that positions the sensor in the width direction.

According to a fourth aspect of the present invention, the holder may include a magnet part that attracts and holds the sensor.

According to a fifth aspect of the present invention, the magnet part may be changeable in position in the width direction.

According to a sixth aspect of the present invention, the motion guide device according to the first to fifth aspects may further include a dust-proof seal disposed on the end face of the folder in the longitudinal direction and configured to prevent foreign materials from intruding between the track body and the movable body.

Advantageous Effects of Invention

In the aforementioned motion guide device, since the folder houses the sensor in a width direction of the track body and holds the sensor such that the sensor faces the encoder scale, the sensor can be freely disposed according to a position of the encoder scale, and maintenance of the sensor can be performed without demounting placing members fixed to the movable body. Since the encoder can be mounted after the placing members are mounted on the movable body, the motion guide device according to the present invention is excellent in assemblability

DESCRIPTION OF EMBODIMENTS

A linear guide 1 according to an embodiment of the present invention will described with reference to the drawings.

Figure 1:
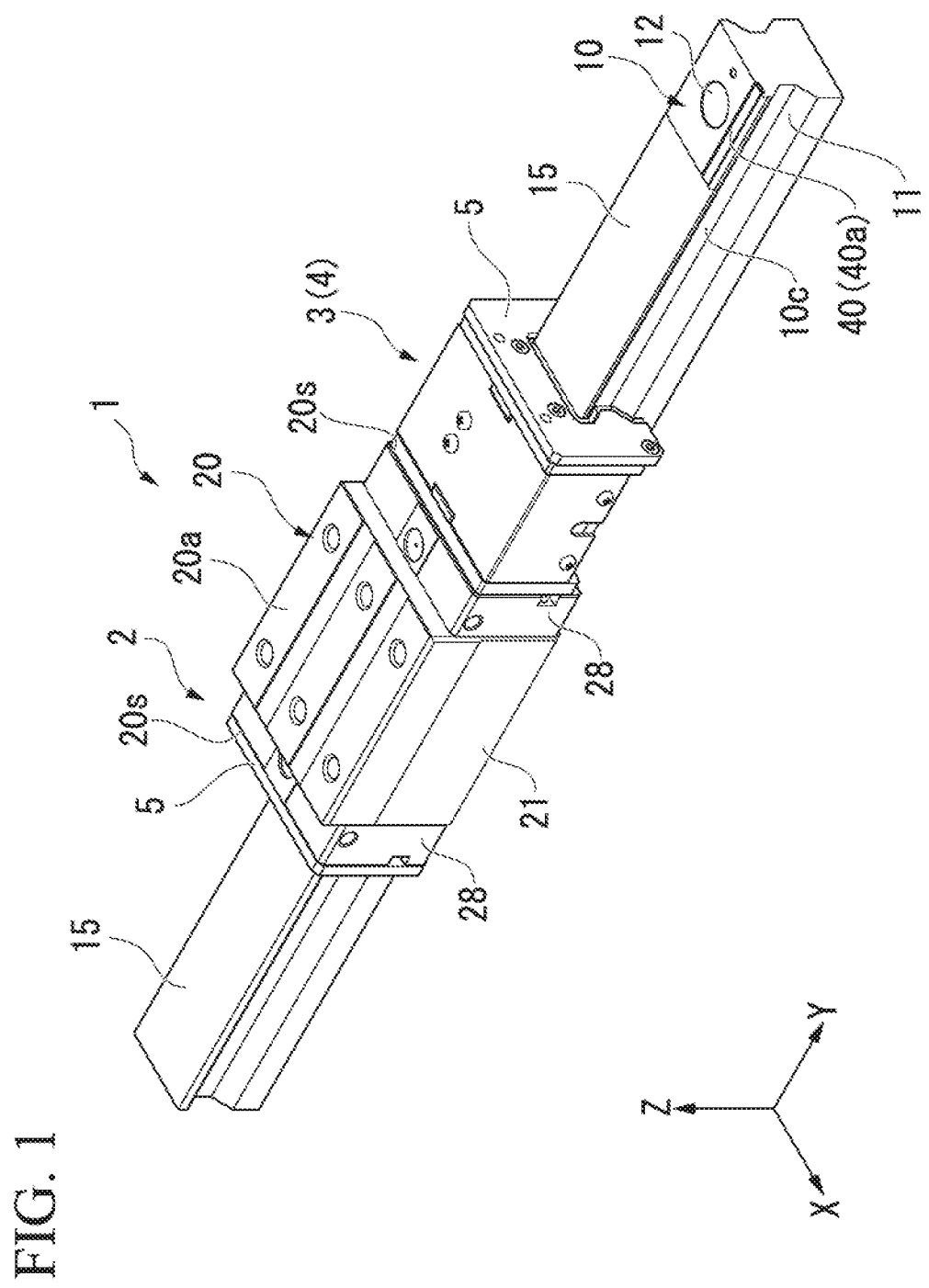
FIG. 1 is a perspective view illustrating a linear guide according to an embodiment of the present invention.

FIG. 1 is a perspective view illustrating a linear guide 1 according to an embodiment of the present invention.

Figure 2A:
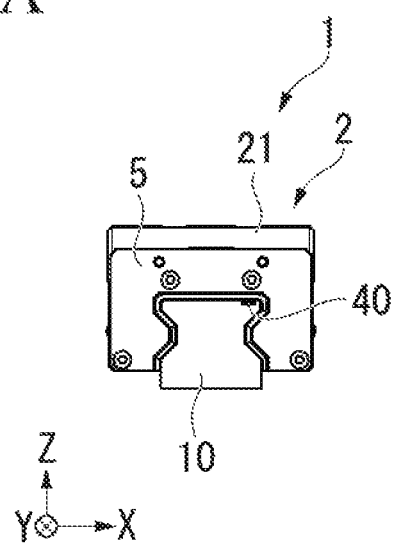
FIG. 2A is a front view illustrating the linear guide according to the embodiment of the present invention.
Figure 2B:
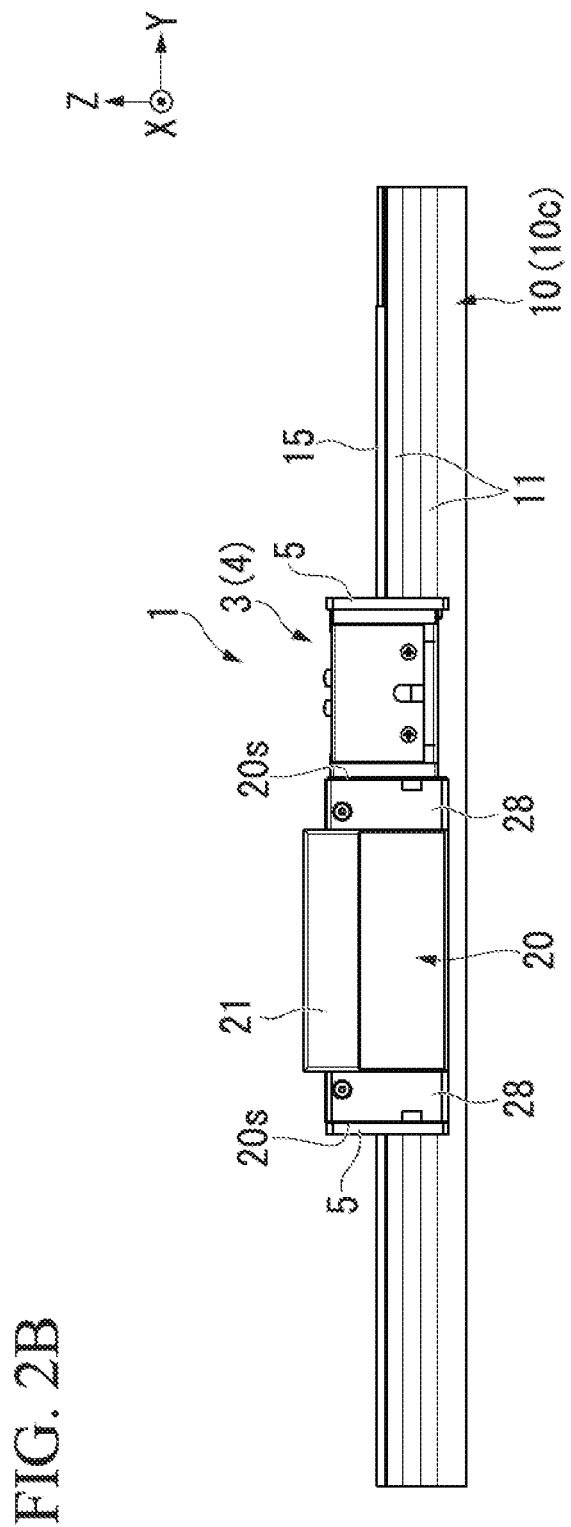
FIG. 2B is a side view illustrating the linear guide according to the embodiment of the present invention.
Figure 2C:
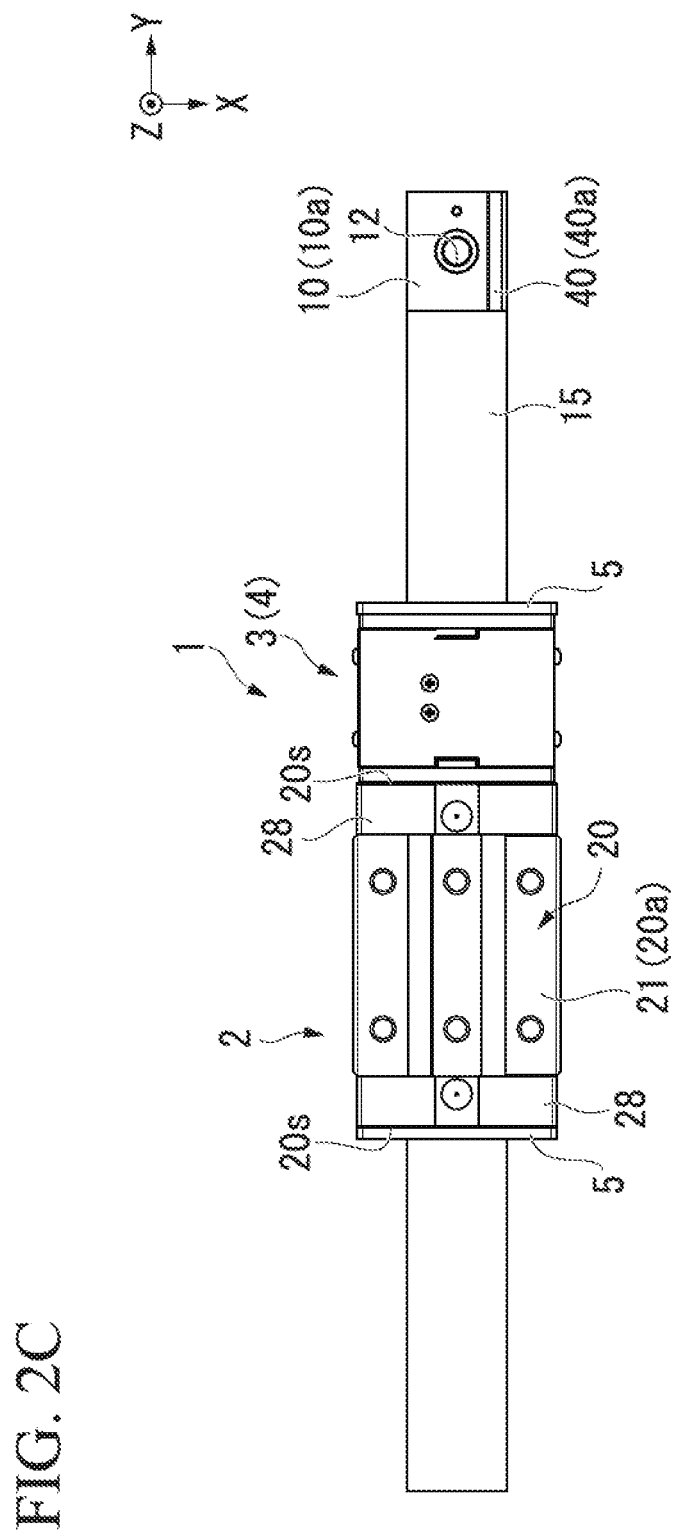
FIG. 2C is a top view illustrating the linear guide according to the embodiment of the present invention.

FIG. 2A is a front view illustrating the linear guide 1. FIG. 2B is a side view illustrating the linear guide 1. FIG. 2C is a top view illustrating the linear guide 1.

A longitudinal direction of a track rail 10 (a moving direction of a slider block 20) is referred to as a Y direction (a longitudinal direction). A surface or a portion directed to the Y direction is referred to as an end face or an end.

A direction in which the track rail 10 and the slider block 20 overlap each other is referred to as a Z direction (a height direction). A +Z direction may be referred to as the top, and a −Z direction may be referred to as the bottom.

A direction perpendicular to the Y direction and the Z direction referred to as an X direction (a width direction). A +X direction may be referred to as the right, and a −X direction may be referred to as the left. A surface directed to the X direction is referred to as a lateral surface.

The linear guide (the motion guide device) 1 is provided with a guide section 2, a position detecting section 3, and so on.

The guide section 2 includes the track rail 10, the slider block 20, and so on. The slider block 20 smoothly moves along the track rail 10.

Placing members, which move along with the slider block 20 may be mounted on an upper surface (an outer surface) 20a of the slider block 20.

The position detecting section 3 includes a linear magnetic encoder 4 made up of an encoder scale 40 and a sensor 50, and detects a relative position between the track rail 10 and the slider block 20.

The position detecting section 3 is disposed on an end face 20s of the slider block 20 in the +Y direction. The position detecting section 3 includes a folder 60 that mounts the sensor 50 on the slider block 20.

Dust-proof seals 5 are mounted on an end face 20s of the slider block 20 in the −Y direction and an end face 60s of the folder 60 in the +Y direction, respectively. The dust-proof seals 5 are each formed in a saddle shape straddling the track rail 10. The dust-proof seals 5 prevent intrusion of foreign materials between the track rail 10 and the slider block 20.

Figure 3:
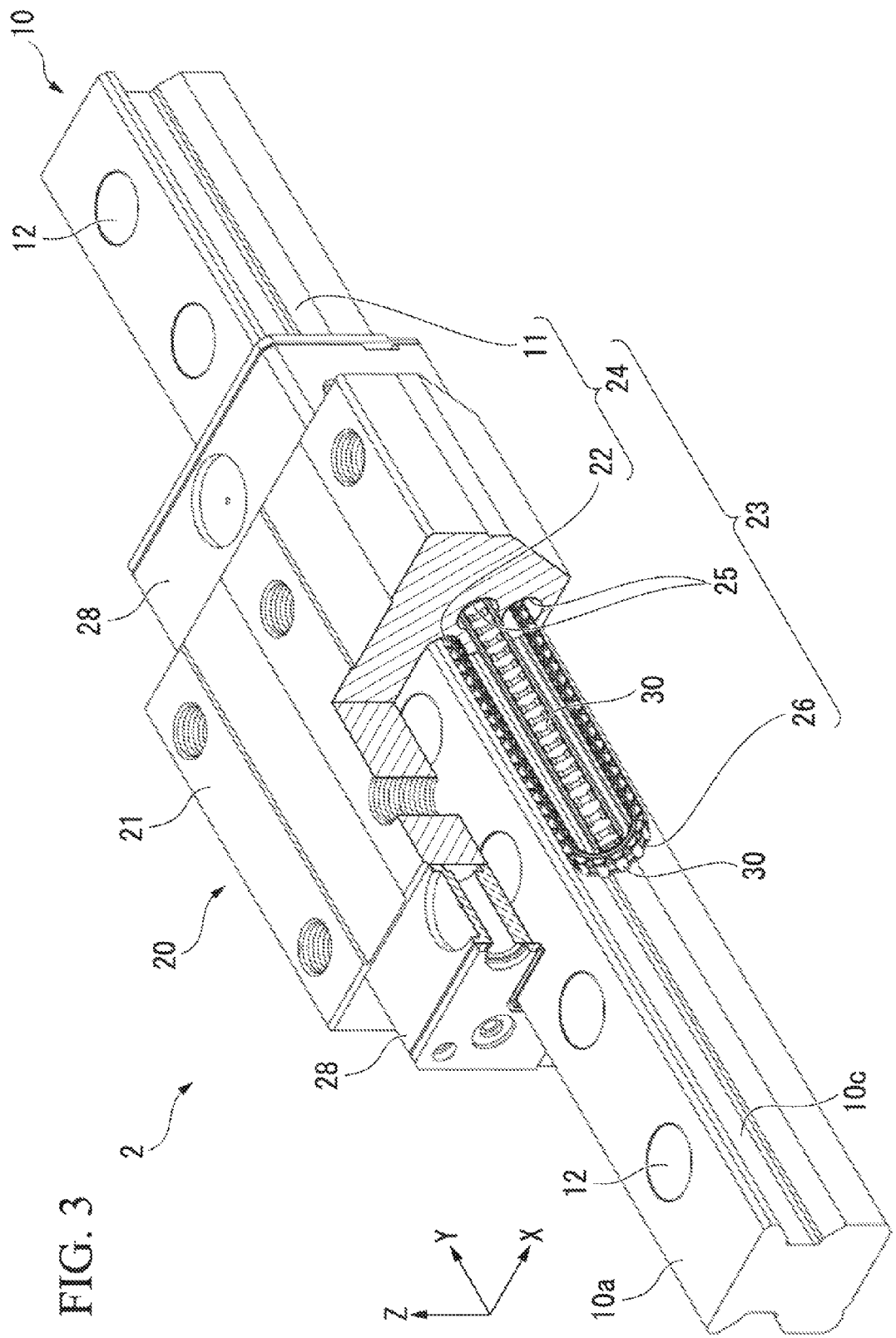
FIG. 3 is a cutaway perspective view illustrating a guide section according to the embodiment of the present invention.

FIG. 3 is a cutaway perspective view illustrating the guide section 2. In FIG. 3, illustration of the encoder scale 40 and a nonmagnetic cover 15 is omitted.

The track rail (track body) 10 is a metal member that is formed in an approximately rectangular shape in a cross section perpendicular to the Y direction and extends in the Y direction.

Among outer surfaces of the track rail 10, a pair of lateral surfaces 10c directed in the width direction (the X direction) are each formed with roller rolling surfaces 11 in the longitudinal direction (the Y direction). The track rail 10 is provided with four roller rolling surfaces 11.

A plurality of bolt mounting holes 12 passing through the track rail 10 in the Z direction are formed in an upper surface (an outer surface) 10a of the track rail 10 at intervals in the Y direction. The plurality of bolt mounting holes 12 are formed in the middle of the upper surface 10a in the width direction.

The track rail 10 is fixed to, for instance, a base member (not shown) by bolts (not show) inserted into the bolt mounting holes 12.

The encoder scale 40 is embedded in the upper surface 10a of the track rail 10 (see FIG. 1). The nonmagnetic cover 15 is mounted on the track rail 10 to cover the upper surface 10a and the encoder scale 40 (see FIG. 1).

The slider block (movable body is provided with a block main body 21 and a pair of lids 28. The block main body 21 and the lid 28 are each formed in a saddle shape straddling the track rail 10.

The pair of lids 28 are mounted on opposite end faces of the block main body 21 in the Y direction. The folder 60 is additionally overlapped and mounted on one of the pair of lids 28 which is disposed in the +Y direction.

The slider block 20 is formed with roller rolling surfaces 22 facing the roller rolling surfaces 11 of the track rail 10. The slider block 20 is formed with endless. circulation paths 23 including the roller rolling surfaces 22. The slider block 20 is formed with four endless circulation paths 23.

The endless circulation paths 23 are each made up of a load roller rolling path 24, a roller return path 25, and a pair of direction change paths 26.

The load roller rolling path 24 is formed from the roller rolling surface 22 and the roller rolling surface 11. The roller return path 25 is formed to extend inside the block main body 21 in parallel to the roller rolling surface 22. Each of the direction change paths 26 is formed in a U shape connecting the load roller rolling path 24 and the roller return path 25. The direction change paths 26 are formed in the lids 28.

A plurality of rollers (rolling elements) 30 are housed and arranged in the endless circulation path 23.

When the slider block 20 is displaced relative to the track rail 10, the plurality of rollers 30 interposed between the roller rolling surface 11 of the track rail 10 and the roller rolling surface 22 of the slider block 20 (housed in the load roller rolling path 24) carry out rolling motion.

The plurality of rollers 30 roll up to one end of the load roller rolling path 24 and are guided to the direction change path 26. Further, the plurality of rollers 30 go through the roller return path 25 and the direction change path 26, and then return to the load roller rolling path 24.

As the plurality of rollers 30 are interposed between the track rail 10 and the slider block 20, resistance when the slider block 20 is displaced relative to the track rail 10 in the Y direction is reduced.

Figure 4A:
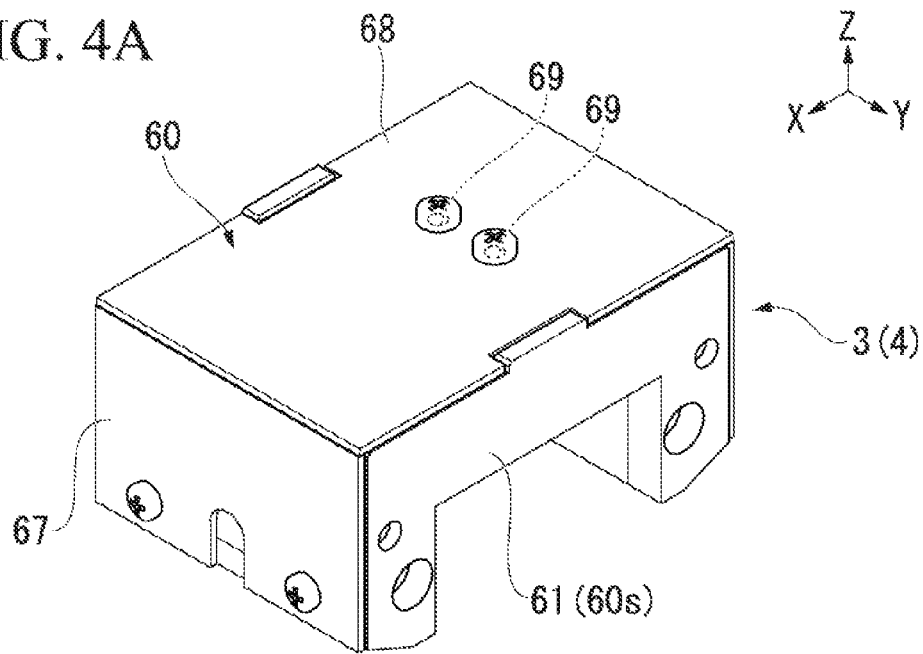
FIG. 4A is a perspective view illustrating a folder and a sensor according to the embodiment of the present invention in a state in which covers are mounted.
Figure 4B:
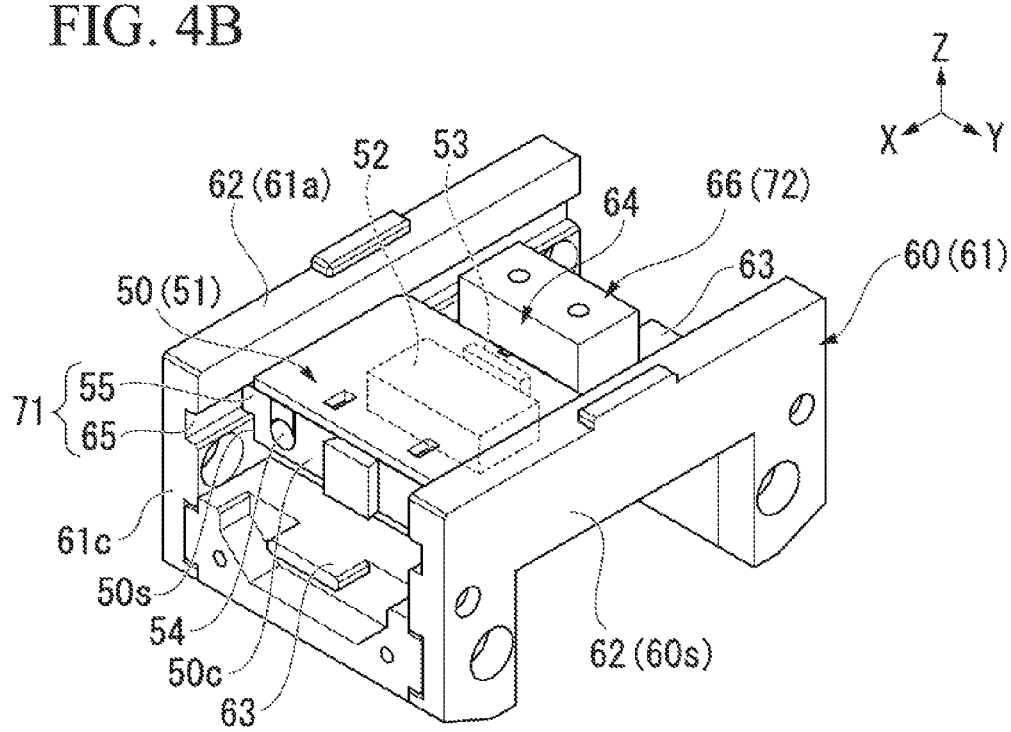
FIG. 4B is a perspective view illustrating the folder and the sensor according to the embodiment of the present invention in a state in which the covers are demounted.

FIG. 4A is a perspective view illustrating the folder 60 and the sensor 50 in a state in which covers 67 and 68 are mounted. FIG. 4B is a perspective view illustrating the folder 60 and the sensor 50 in a state in which the covers 67 and 68 are demounted.

Figure 5A:
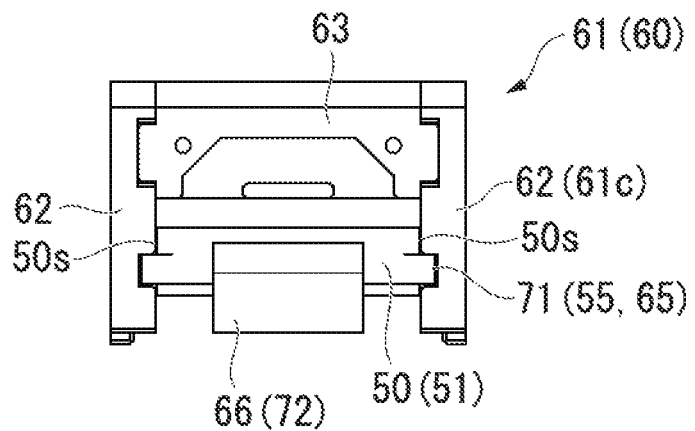
FIG. 5A is a right side view illustrating the folder and the sensor according to the embodiment of the present invention.
Figure 5B:
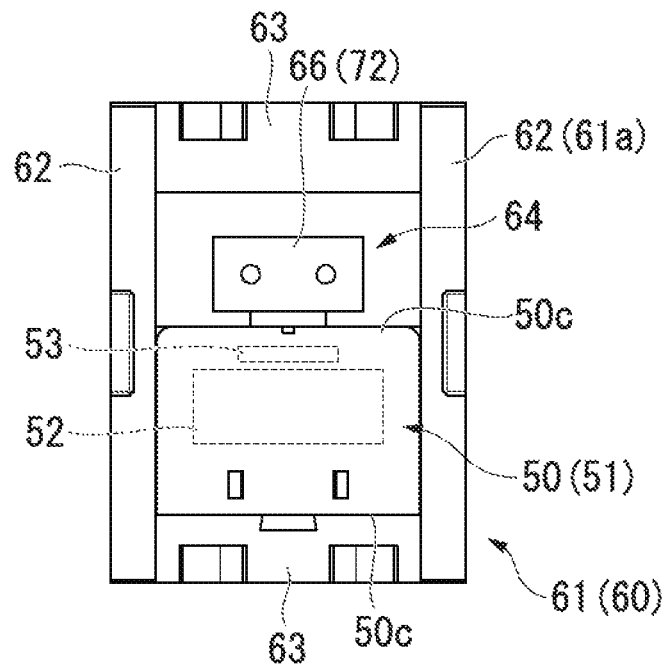
FIG. 5B is a top view illustrating the folder and the sensor according to the embodiment of the present invention.
Figure 5C:
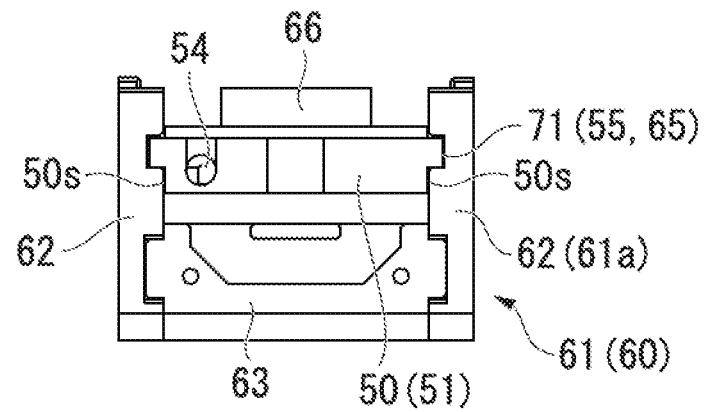
FIG. 5C is a left side view illustrating the folder and the sensor according to the embodiment of the present invention.
Figure 5D:
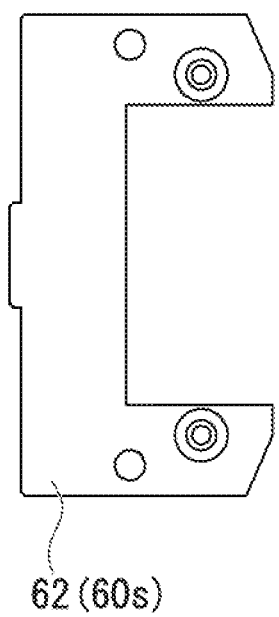
FIG. 5D is a front view illustrating the folder and the sensor according to the embodiment of the present invention.

FIG. 5A is a right side view illustrating the folder 60 and the sensor 50. FIG. 5B is a top view illustrating the folder 60 and the sensor 50. FIG. 5C is a left side view illustrating the folder 60 and the sensor 50. FIG. 5D is a front view illustrating the folder 60 and the sensor 50.

The position detecting section 3 includes the folder 60 and the sensor 50.

The linear magnetic encoder 4 is made up of the encoder soak 40 and the sensor 50. This linear magnetic encoder 4 has, for instance, a resolution of about 1 μm.

The encoder scale 40 is formed of an elongate rectangular magnetic material. The encoder scale 40 is embedded in the upper surface 10a of the track rail 10. N-poles and S-poles are alternately magnetized on an upper surface 40a of the encoder scale 40 at a constant pitch (e.g., 2 mm).

A groove having almost the same shape as a cross-sectional shape of the encoder scale 40 is formed in the upper surface 10a of the track rail 10 along the track rail 10. This groove is disposed at the right or left side in the width direction in the upper surface 10a of the track rail 10 to avoid the bolt mounting holes 12.

The upper surface 40a of the encoder scale 40 and the upper surface 10a of the track rail 10 are aligned such that a difference in height does not occur. The upper surface 40a of the encoder scale 40 is exposed to the upper surface 10a of the track rail 10.

The nonmagnetic cover 15 is mounted on the upper surface 10a of the track rail 10. The nonmagnetic cover 15 is formed of for instance, a resin, and covers the upper surface 10a of the track rail 10 and the upper surface 40a of the encoder scale 40.

The upper surface 40a of the encoder scale 40 is covered with the nonmagnetic cover 15, and thereby is protected such that for instance, cut chips, a coolant, etc. do not stick to the encoder scale 40.

The sensor 50 is a sensor having a magneto-resistive (MR) element. The sensor 50 detects magnetism of the upper surface 40a of the encoder scale 40 by means of the MR element 52. The sensor 50 relatively moves along the encoder scale 40, thereby outputting a sinusoidal signal.

A signal detected. by the sensor 50 can be used for various purposes.

For example, when the guide section 2 is driven by a linear motor, a detected signal of the sensor 50 is sent to a motor driver via a signal processor. This motor driver controls an electric current supplied to a coil section of the linear motor such that the slider block 20 moves to an instructed position on the basis of a position instruction from a user terminal. In this way, the linear motor driving the guide section 2 can be controlled.

The sensor 50 is provided with a sensor main body 51 having a rectangular flat plate shape formed by a resin molding. The MR element 52 is embedded in the sensor main body 51. The MR element 52 is disposed nearly in the center of the sensor main body 51 of the sensor 50.

Opposite end faces 50s (see FIGS. 4B and 5C) of the sensor main body 51 in the Y direction have respective protrusions 55 formed in the X direction. The protrusions (ends) 55 are formed in a shape having a rectangular cross-sectional shape.

A magnet 53 such as an iron piece is embedded. in a right (+X direction) lateral surface 50c of the sensor main body 51. An electric cable 54 connected o the MR element 52 is connected to a left (−X direction) lateral surface 50e of the sensor main body 51.

The folder 60 is a member that mounts the sensor 50 on the slider block 20. The folder 60 is mounted on the end face 20s of the lid 28 of the slider block 20 in the +Y direction.

When viewed in the Y direction, the folder 60 is formed nearly in the same shape as the lid 28. That is, the folder 60 is formed in a saddle shape straddling the track rail 10. The folder 60 is formed to be thicker than the lid 28 in the Y direction.

The folder 60 is provided with a folder main body 61 made of a resin, two lateral surface covers 67, and an upper surface cover 68.

The two lateral surface covers 67 cover opposite lateral surfaces 61c of the folder main body 61. The upper surface cover 68 covers an upper surface 61a of the folder main body 61.

The folder main body 61 has a pair of saddle-like parts 62 and a pair of connectors 63, both of which are integrally formed.

The saddle-like parts 62 are saddle-like planar parts disposed at opposite sides in the Y direction. The connectors 63 are parts that extend from lower portions of the saddle-like parts 62 in the Y direction and couple the saddle-like parts 62. The folder main body 61 is formed in a frame shape by the pair of saddle-like parts 62 and the pair of connectors 63.

The lateral surface covers 67 and the upper surface cover 68 are each formed of a rectangular metal sheet. The lateral surface covers 67 are closely attached to the lateral surfaces 61c of the folder main body 61. The upper surface cover 68 is closely attached to the upper surface 61a of the folder main body 61 (to upper surfaces of the pair of saddle-like parts 62).

A housing part 64 in which the sensor 50 is housed is provided between the saddle-like parts 62 of the folder main body 61. The housing part 64 is formed at a portion (a space) of the folder main body 61 which faces the upper surface 10a of the track rail 10 (the upper surface 40a of the encoder scale 40).

The upper surface 10a of the track rail 10 is exposed in the −Z direction of the housing part 64, and the upper surface cover 68 is disposed in the +Z direction of the housing part 64. The lateral surface covers 67 are disposed in the +X and −X directions of the housing part 64, respectively.

An interval (a distance in the Y direction) between the saddle-like parts 62 is slightly shorter than a length of the sensor 50 in the Y direction. Grooves (guide parts) 65 along the X direction are formed in inner surfaces of the saddle-like parts 62 which face each other. The grooves 65 are formed in a rectangular cross-sectional shape. The protrusions 55 of the sensor 50 are fitted into these grooves 65.

That is, as the protrusions 55 of the opposite end face 50s of the sensor 50 are fitted into the grooves 65 of the folder main body 61, the sensor 50 is housed in the lousing part 64 of the fielder 60.

When the sensor 50 is housed in the housing part 64, the MR element 52 is disposed opposite to the upper surface 10a of the track rail 10 with a slight gap.

The grooves 65 are formed over the full length of the folder main body 61 (the saddle-like parts 62) in the width direction (the X direction). That is, the housing part 64 is formed to pass through the folder main body 61 in the X direction. In other words, the housing part 64 is open to the opposite sides of the folder main body 61 in the X direction. For this reason, the sensor 50 is housed in the housing part 64 of the folder 60 from the either side (+X or −X direction) of the housing part 64 in the width direction.

When the protrusions 55 are fitted into the grooves 65, three outer surfaces forming each of the protrusions 55 and three inner surfaces forming each of the grooves 65 come into contact with each other. For example, three outer surfaces (an outer surface 55s directed to the −Y direction, an outer surface 55a directed to the direction, an outer surface 55h directed to the −Z direction) of each of the protrusions 55 directed to the −Y direction and three inner surface (an inner surface 65s directed to the +Y direction, an inner surface 65a directed to the +Z direction, and an inner surface 65b directed to the −Z direction) of each of the grooves 65 directed to the +Y direction come into contact with each other.

For this reason, the sensor 50 cannot move relative to the tender 60 (the folder main body 61) in the Y and Z directions. Moreover, the sensor 50 cannot rotate relative to the folder 60 around the X, Y and Z directions.

On the other hand, the sensor 50 can move relative to the folder 60 in the X direction in the state in which the protrusions 55 are fitted into the grooves 65.

In this way, the housing part 64 of the folder 60 holds the sensor 50 in the directions other than the X direction while positioning the sensor 50. That is, the housing part 64 of the folder 60 is provided with fitting parts 71 at which the protrusions 55 are fitted into the grooves 65, and positions and holds the sensor 50 in the directions other than the X direction.

In addition, the housing part 64 of the folder 60 is provided with a holder 72 that positions and holds the sensor 50 in the X direction. The holder 72 is provided with a magnet part 66 that attracts and holds the sensor 50.

The magnet 53 is embedded in the sensor main body 51 of the sensor 50. The magnet part 66 suppresses movement of the sensor 50 in the X direction by attracting and holding the magnet 53.

When the magnet part 66 attracts and holds the sensor 50 at the housing part 64, the MR element 52 is disposed opposite to the upper surface 40a of the encoder scale 40 with a slight gap.

The magnet part 66 is disposed at the housing part 64. The magnet part 66 is mounted on a lower surface 68b of the upper surface cover 68. As the upper surface cover 68 is mounted on the upper surface 61a of the folder main body 61 (saddle-like parts 62), the magnet part 66 is disposed at the housing part 64.

The upper surface cover 68 is provided with screw holes 69 for mounting the magnet part 66. A position of the magnet part 66 in the X direction at the housing part 64 can be changed by changing positions of the screw holes 69 in the X direction. When the position of the magnet part 66 in the X direction is changed, a position of the sensor 50 in the X direction is changed at the housing part 64.

Figure 6:
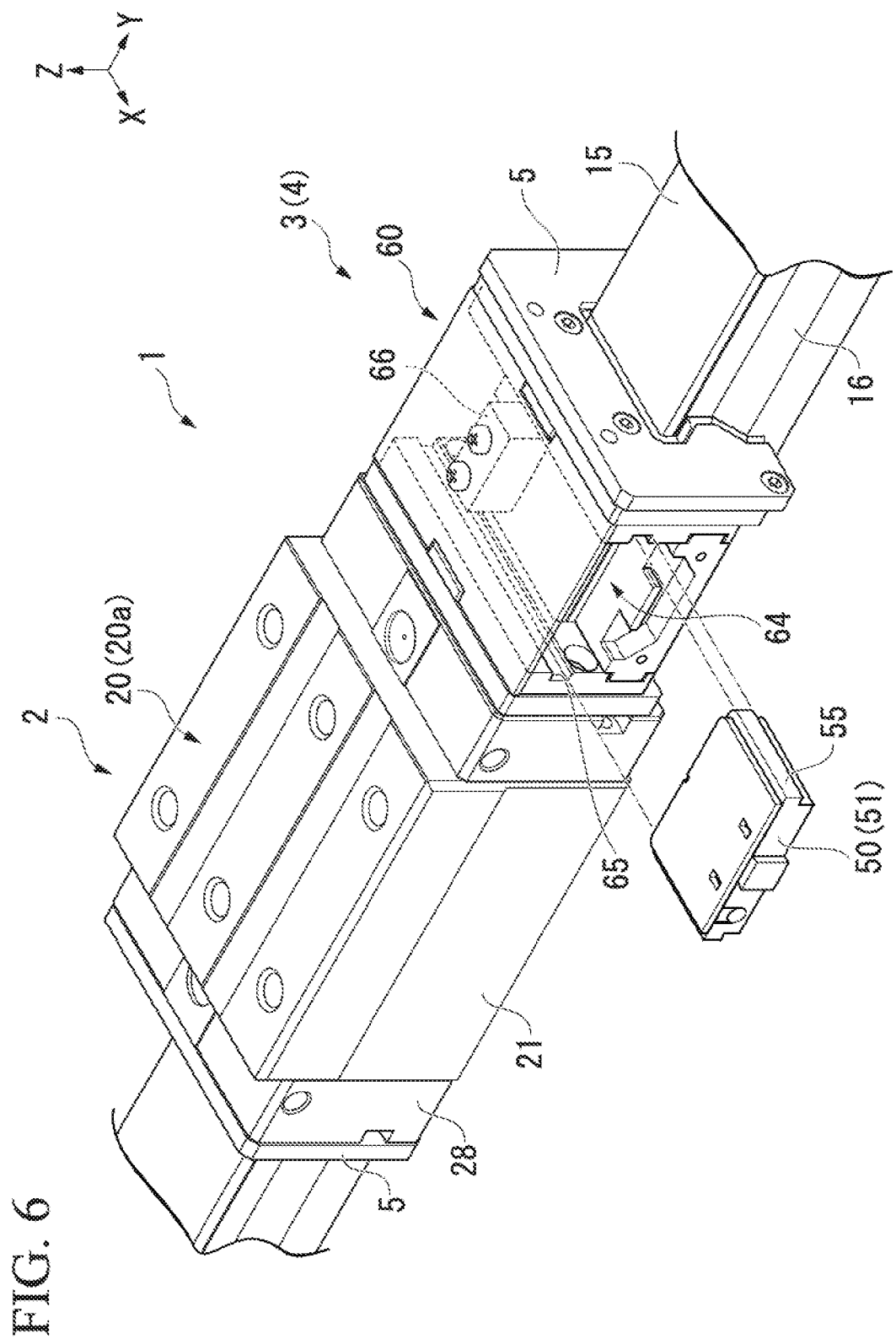
FIG. 6 is a perspective view illustrating a procedure for mounting or demounting the sensor on or from the folder.

FIG. 6 is a perspective view illustrating a procedure for mounting or demounting the sensor 50 on or from the folder 60.

Figure 7A:
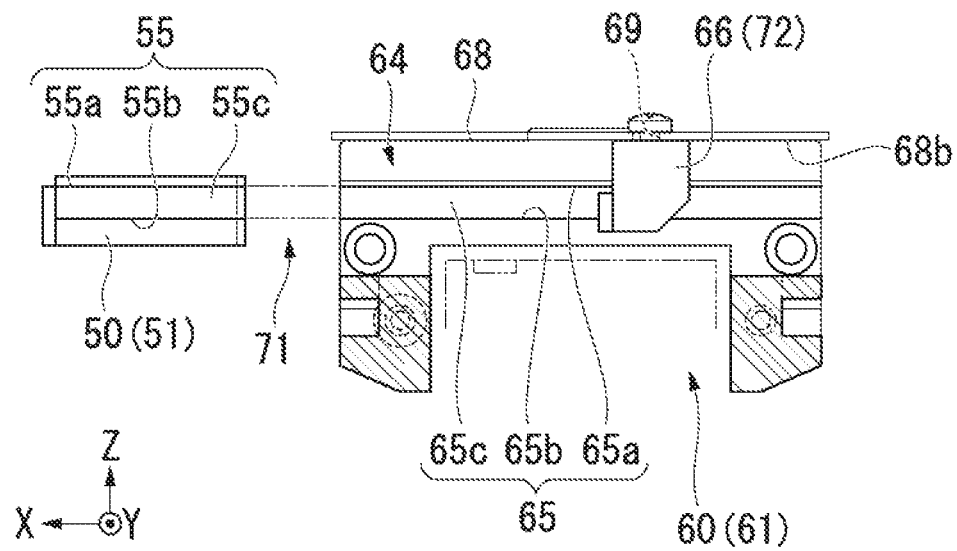
FIG. 7A is a view illustrating the procedure for mounting or demounting the sensor on or from the folder, and shows a demounted state.
Figure 7B:
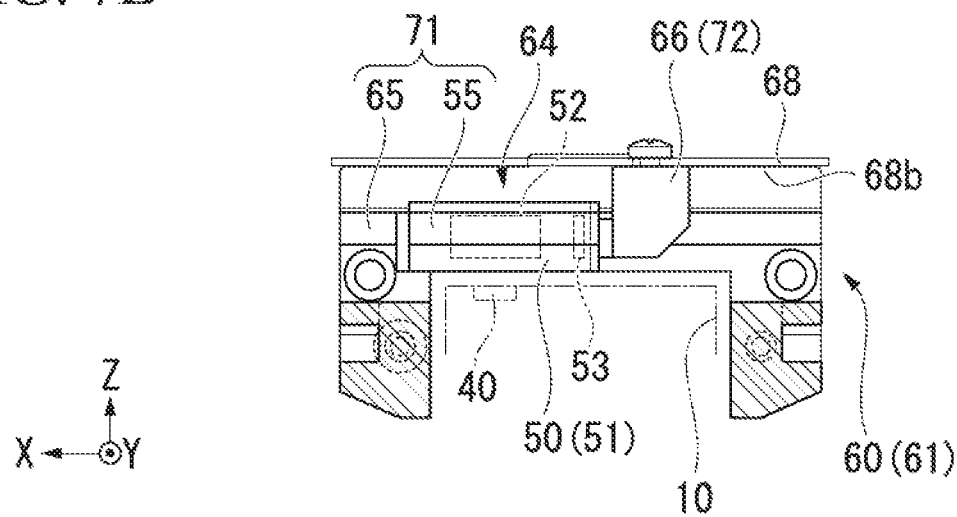
FIG. 7B is a view illustrating the procedure for mounting or demounting the sensor on or from the folder, and shows a mounted state.

FIG. 7A is a view illustrating the procedure for mounting or demounting the sensor 50 on or from the folder 60, and shows a demounted state. FIG. 7B is a view illustrating the procedure for mounting or demounting the sensor 50 on or from the folder 60, and shows a mounted state.

When the sensor 50 is mounted on the folder 60, the lateral surface covers 67 mounted on the lateral surfaces 61c of the folder main body 61 are demounted. When the magnet part 66 is disposed at the −X direction side of the folder main body 61, the lateral surface cover 67 mounted on the lateral surface 61c of the folder main body 61 in the +X direction is demounted.

Thereby, the housing part 64 appears on (is open to) the lateral surface 61c of the folder main body 61 in the +X direction.

Next, the sensor 50 is inserted into the housing part 64. The protrusions 55 of the opposite end faces 50s of the sensor 50 are fitted into the grooves 65 of the folder main body 61. The sensor 50 is displaced relative to the folder main body 61 in the −X direction. The protrusions 55 of the sensor 50 come into sliding contact with the grooves 65 of the folder main body 61, and the sensor 50 is guided in the X direction.

When the sensor 50 is housed in the housing part 64, the sensor 50 is attracted and held to the magnet part 66. The lateral surface 50c of the sensor 50 is housed in the housing part 64 in contact with the magnet part 66.

Finally, the demounted lateral surface covers 67 are mounted on the folder main body 61.

Thereby, the mounting of the sensor 50 on the folder 60 is completed.

When the sensor 50 is demounted from the folder 60, this is performed in a procedure opposed to the mounting procedure.

In this way, the linear guide 1 according to the embodiment of the present invention is provided with the folder 60 that is disposed on the end face of the slider block 20 in the Y direction, houses the sensor 50 in the X direction, and holds the sensor 50 such that the sensor 50 laces the encoder scale. For this reason, the sensor 50 can be mounted or demounted on or from the lateral surface 61c of the folder 60 (the folder main body 61). Therefore, even if a malfunction occurs at the sensor 50, maintenance of the sensor 50 can be performed without demounting placing members from the slider block 20.

Since the folder 60 is provided with the grooves 65 that guide the sensor 50 in the X direction, the sensor 50 can be easily and reliably disposed at the position at which it is opposite to the encoder scale.

Since the grooves 65 position the sensor 50 in the Y and Z directions, the positioning of the sensor 50 in the Y and Z directions is reliably performed.

Since the folder 60 is provided with the holder 72 that positions the sensor 50 in the X direction, the positioning of the sensor 50 in the X direction is reliably performed.

Since the holder 72 is provided with the magnet part 66 that attracts and holds the sensor 50, the positioning of the sensor 50 in the X direction is reliably performed.

For example, even if a vibration is applied to the slider block 20 and the sensor 50 is separated from the magnet part 66, the magnet part 66 attracts the sensor 50, and thus the sensor 50 is held on the magnet part 66 again. In this way, since the holder 72 is not loosened by the vibration like a screw, the positioning of the sensor 50 is reliably performed.

Since the magnet part 66 can be changed in position in the X direction, the sensor 50 (the MR element 52) can be disposed opposite to the encoder scale 40. For this reason, it is possible to reliably operate the linear magnetic encoder 4.

For example, even if the position at which the encoder scale 40 is installed on the track rail 10 in the X direction is changed, the sensor 50 can be easily disposed opposite to the encoder scale 40.

The dust-proof seal 5 is disposed at the end face 60s of the folder 60 in the +Y direction. For this reason, foreign materials such as cut chips are prevented from intruding between the sensor 50 and the encoder scale 40. Therefore, it is possible to reliably operate the linear magnetic encoder 4 without being influenced by the foreign materials.

Since the linear guide 1 is used for various purposes, a large type and a small type are prepared. For this reason, the folder 60 is formed in a shape (a width dimension) corresponding to a width dimension of the track rail 10 and the slider block 20. That is, a length of the housing part 64 (the grooves 65) or the upper surface cover 68 of the folder 60 in the X direction is adjusted (changed) in accordance with a width dimension of the linear guide 1.

Even in the large or small type linear guide 1, since the folder 60 is provided with the fitting part 71 and the holder 72, the aforementioned effect is obtained. In the folder 60, as the position of the magnet part 66 in the X direction is adjusted, the sensor 50 (the MR element 52) can be disposed opposite to the encoder scale 40.

All of the shapes and combinations of the constituent members shown in the aforementioned embodiments are one example, and can be variously changed on the basis of design requirements without departing from the scope of the present invention.

The opposite end faces 50s of the sensor 50 are not limited to the case in which they are provided with the respective protrusions 55. For example, the pair of grooves 65 of the folder 60 may be in sliding contact with the end faces 50s, the upper surface, and the lower surface of the sensor 50.

Grooves may be provided in the opposite end faces 50s of the sensor 50, and a pair of protrusions may be provided for the folder 60. The grooves and the protrusions may be fitted with each other.

A plurality of screw holes 69 may be provided in the upper surface cover 68 at constant intervals in the X direction.

As any of the plurality of screw holes 69 is used, the positions of the magnet part 66 and the sensor 50 in the X direction can be arbitrarily changed.

A plurality of upper surface covers 68 in which the positions of the screw holes 69 in the X direction are different may be prepared. As any of the plurality of upper surface covers 68 is selected, the positions of the magnet part 66 and the sensor 50 in the X direction can be arbitrarily changed.

The screw holes 69 may be oval holes extending in the X direction. Since it is possible to slide the magnet part 66 in the X direction, the position of the sensor 50 in the X direction can be arbitrarily changed.

Balls may be used instead of the rollers 30. The linear guide 1 may be a sliding guide device that does not require the rollers 30 or the balls.

The position detecting section 3 is not limited to the case in which it is provided with the linear magnetic encoder 4, and may be the case in which it is provided with a linear optical encoder (an optical encoder).

INDUSTRIAL APPLICABILITY

In the aforementioned motion guide device, since the folder houses the sensor in the width direction of the track body and holds the sensor such that the sensor faces the encoder scale, the sensor can be freely disposed according to the position of the encoder scale, and the maintenance of the sensor can be performed without demounting the placing members fixed to the movable body. Since the encoder can be mounted after the placing members are mounted on the movable body, the motion guide device according to the present invention is excellent in assemblability.

REFERENCE SIGNS LIST

1 Linear guide (motion guide device)
5 Dust-proof seal
10 Track rail (track body)
20 Slider block (movable body)
20s End face
40 Encoder scale
50 Sensor
60 Folder
60s End face
65 Groove (guide part)
66 Magnet part
71 Fitting part
72 Holder
160, 260 Folder

The invention claimed is:
1. A motion guide device comprising:
a track body that extends in a longitudinal direction;
a movable body mounted on the track body and configured to be movable along the track body;
an encoder scale disposed at the track body in the longitudinal direction;
a sensor disposed opposite to the encoder scale; and
a folder disposed at an end face of the movable body in the longitudinal direction and configured to house the sensor in a width direction of the track body and hold the sensor such that the sensor faces the encoder scale, wherein
the folder comprises a guide part that guides the sensor in the width direction of the track body, and
the guide part is a fitting part which slidably receives the sensor into the folder in the width direction of the track body.

2. The motion guide device according to claim 1, wherein the folder includes a holder that positions the sensor in the width direction.

3. The motion guide device according to claim 2, wherein the holder includes a magnet part that attracts and holds the sensor.

4. The motion guide device according to claim 3, wherein the magnet part is changeable in position in the width direction.

5. The motion guide device according to claim 4, further comprising a dust-proof seal disposed on the end face of the folder in the longitudinal direction and configured to prevent foreign materials from intruding between the track body and the movable body.

6. The motion guide device according to claim 3, further comprising a dust-proof seal disposed on the end face of the folder in the longitudinal direction and configured to prevent foreign materials from intruding between the track body and the movable body.

7. The motion guide device according to claim 2, further comprising a dust-proof seal disposed on the end face of the folder in the longitudinal direction and configured to prevent foreign materials from intruding between the track body and the movable body.

8. The motion guide device according to claim 1, further comprising a dust-proof seal disposed on the end face of the folder in the longitudinal direction and configured to prevent foreign materials from intruding between the track body and the movable body.

9. The motion guide device according to claim 1, wherein the folder includes a holder that positions the sensor in the width direction.

10. The motion guide device according to claim 1, further comprising a dust-proof seal disposed on the end face of the folder in the longitudinal direction and configured to prevent foreign materials from intruding between the track body and the movable body.

* * * * *